US011614792B2

(12) United States Patent
Anderson et al.

(10) Patent No.: US 11,614,792 B2
(45) Date of Patent: Mar. 28, 2023

(54) COORDINATING VEHICLE CONTROLLER SHUTDOWN

(71) Applicant: Ford Global Technologies, LLC, Dearborn, MI (US)

(72) Inventors: Alexander Anderson, Dearborn, MI (US); John Patrick New, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 17/100,488

(22) Filed: Nov. 20, 2020

(65) Prior Publication Data

US 2022/0164019 A1  May 26, 2022

(51) Int. Cl.
*G06F 1/32* (2019.01)
*G06F 1/3287* (2019.01)
*G06F 1/3296* (2019.01)
*G06F 1/3209* (2019.01)
*G06F 1/3228* (2019.01)

(52) U.S. Cl.
CPC .......... *G06F 1/3287* (2013.01); *G06F 1/3209* (2013.01); *G06F 1/3296* (2013.01); *G06F 1/3228* (2013.01)

(58) Field of Classification Search
CPC .... G06F 1/3287; G06F 1/3209; G06F 1/3296; G06F 1/3228
See application file for complete search history.

(56) References Cited

U.S. PATENT DOCUMENTS

| 7,386,853 | B2 | 6/2008 | Hanzawa | |
|---|---|---|---|---|
| 2009/0119528 | A1 | 5/2009 | Yang et al. | |
| 2013/0103959 | A1* | 4/2013 | Hatta | G06F 1/26 713/300 |
| 2014/0047255 | A1* | 2/2014 | Sasaki | H04L 12/40 713/323 |
| 2018/0194306 | A1* | 7/2018 | Rtail | F02N 11/14 |

FOREIGN PATENT DOCUMENTS

CN  106494321 A  3/2017

* cited by examiner

*Primary Examiner* — Stefan Stoynov
(74) *Attorney, Agent, or Firm* — David B Kelley; Brooks Kushman P.C.

(57) ABSTRACT

A vehicle includes a first controller that sends a request to enter a lower power mode, and a plurality of second controllers. The second controllers each periodically send the first controller signals indicating operation in a normal power mode while being powered by a primary power converter, and responsive to receiving the request, do not send the signals during the low power mode while being capable of powered by an auxiliary power converter that has a maximum power limit less than the primary power converter. Also, the first controller, responsive to not receiving the signals for a predetermined period of time, disconnects the first and second controllers from the primary power converter.

16 Claims, 2 Drawing Sheets

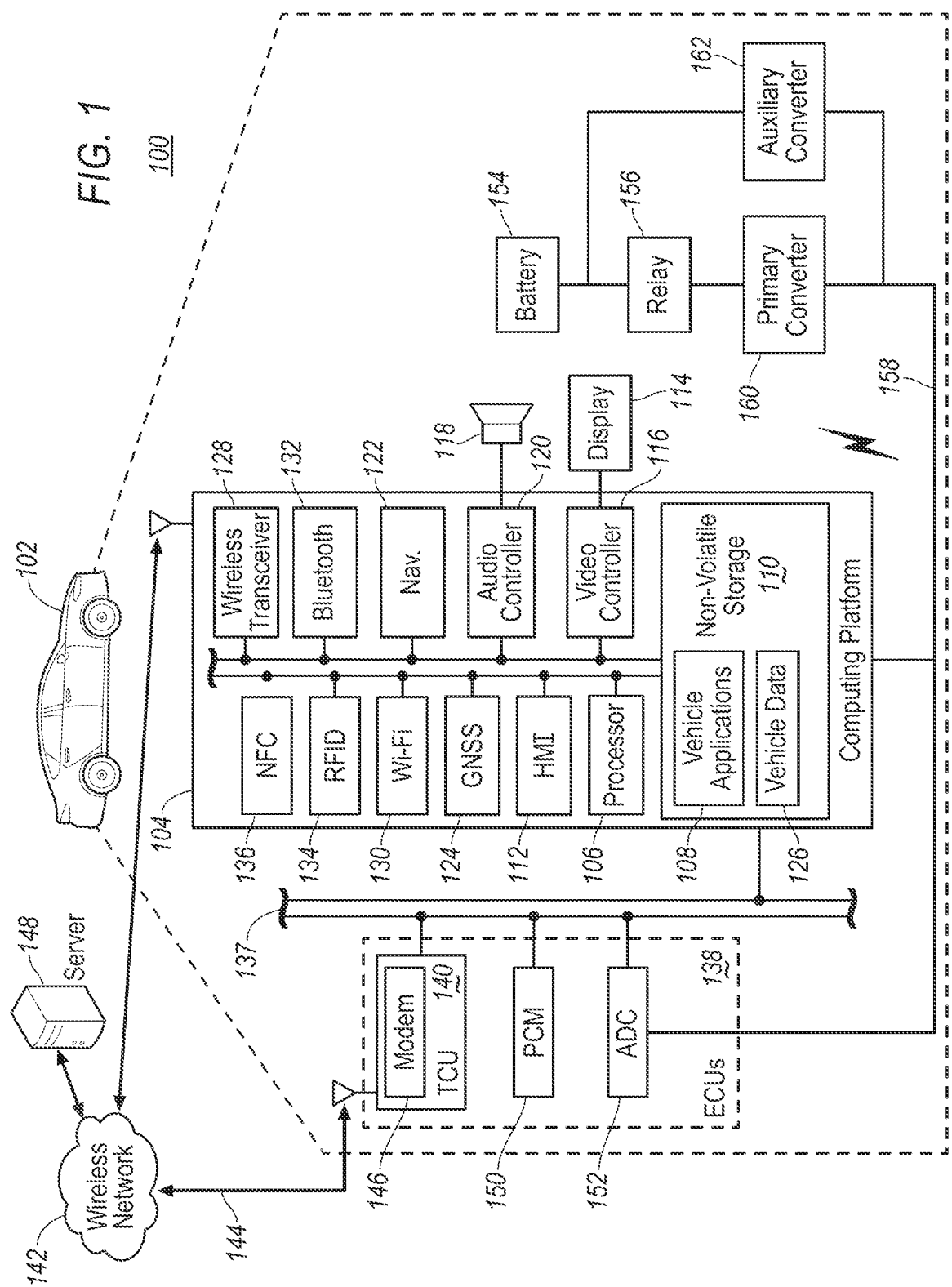

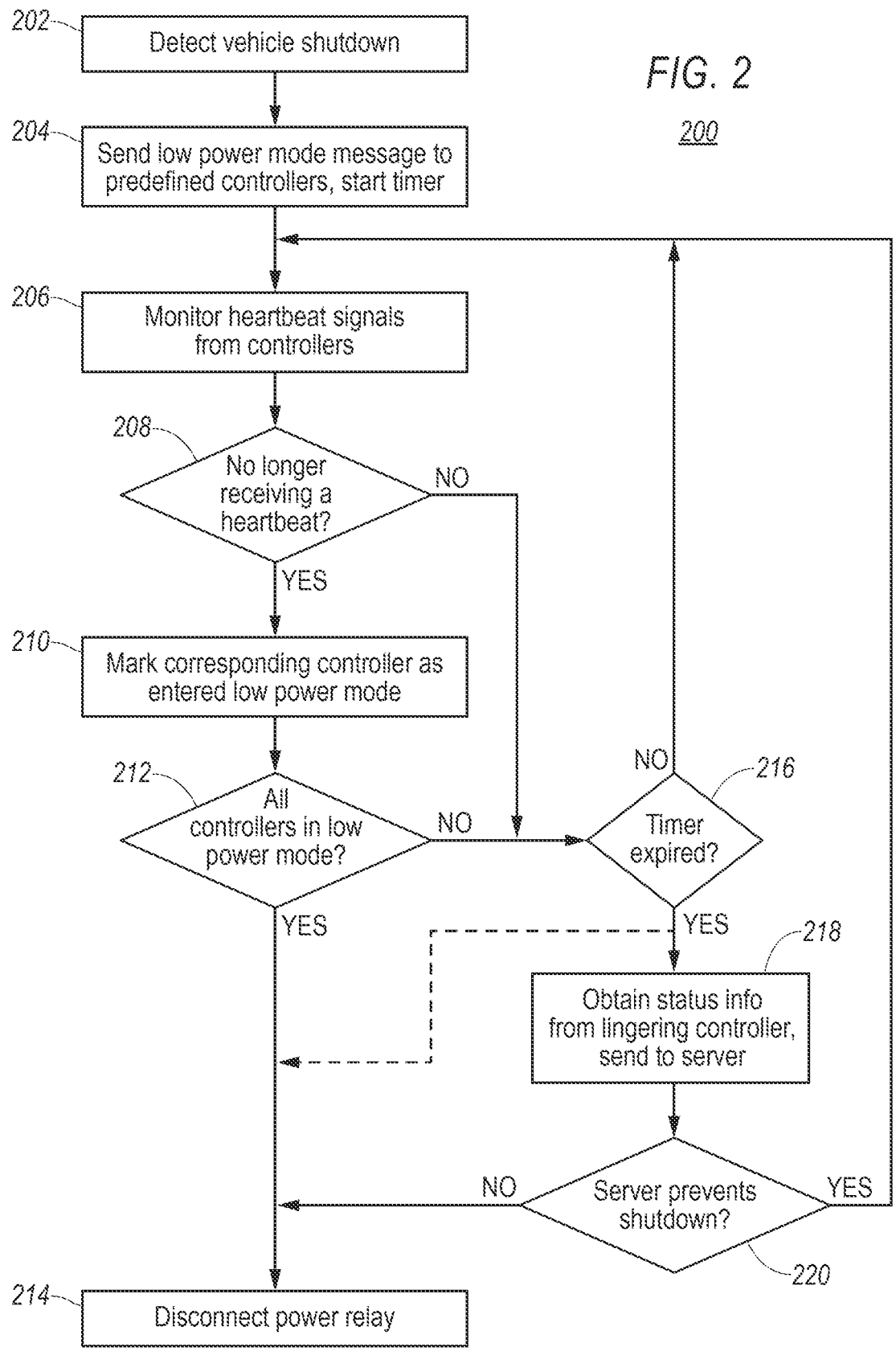

COORDINATING VEHICLE CONTROLLER SHUTDOWN

TECHNICAL FIELD

The present disclosure relates to strategies for coordinating shutdown of vehicle controllers.

BACKGROUND

Modern vehicles may be provided with a number of electronic control units (ECUs) to enable various features. The ECUs are powered by primary and auxiliary power supplies and communicate with one another via an in-vehicle network such as a controller area network (CAN). One or more of the ECUs may be provided with the ability to disconnect the primary power from the input of the system to remove the primary power from all connection units. When the primary power is removed, the ECUs may still have a current draw on the auxiliary power converter to sustain various subsystems such as keeping the memory alive, the real-time clock, or the like.

SUMMARY

A vehicle controller system includes a first controller and a plurality of second controllers. Each of the second controllers periodically sends the first controller signals indicating operation in a normal power mode while being powered by a primary power converter, transitions to a low power mode, in which the second controller consumes less power than during the normal power mode, while being powered by the primary power converter, does not send the signals during the low power mode while being capable of powered by an auxiliary power converter that has a maximum power limit less than the primary power converter, and is precluded from the transition responsive to being exclusively powered by the auxiliary power converter. The first controller sends the second controllers a request to enter the low power mode, and responsive to not receiving the signals for a predetermined period of time, disconnects the first and second controllers from the primary power converter without disconnecting the first and second controllers from the auxiliary power converter.

A method of powering down vehicle controllers includes periodically sending, from each of a plurality of secondary controllers to a primary controller, signals indicating operation in a normal power mode while the secondary controllers are being powered by a primary power converter, sending, from the primary controller to the secondary controllers, a request to enter a low power mode in which the secondary controllers consume less power than during the normal power mode, and responsive to the secondary controllers receiving the request, transitioning by the secondary controllers to the low power mode and discontinuing by the secondary controllers the sending of the signals while being powered by an auxiliary power converter that has a maximum power limit less than the primary power converter. The method further includes responsive to the primary controller not receiving for a predetermined period of time the signals after the sending the request to enter the lower power mode, disconnecting the primary and secondary controllers from the primary power converter without disconnecting the primary and secondary controllers from the auxiliary power converter.

A vehicle includes a first controller that sends a request to enter a lower power mode, and a plurality of second controllers. The second controllers each periodically send the first controller signals indicating operation in a normal power mode while being powered by a primary power converter, and responsive to receiving the request, do not send the signals during the low power mode while being powered by an auxiliary power converter that has a maximum power limit less than the primary power converter. The second controllers consume less power during the low power mode than during the normal power mode. The first controller, responsive to not receiving the signals for a predetermined period of time, disconnect the first and second controllers from the primary power converter without disconnecting the first and second controllers from the auxiliary power converter.

BRIEF DESCRIPTION OF THE DRAWINGS

FIG. 1 illustrates an example block topology of a vehicle system; and

FIG. 2 illustrates an example flow diagram of a process for coordinating vehicle controller shutdown.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle power management system. More specifically, the present disclosure proposes a vehicle power management system for coordinating vehicle controller/ECU shutdown.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV).

A computing platform 104 may include one or more processors 106 configured to perform instructions, commands, and other routines in support of the processes described herein. For instance, the computing platform 104 may be configured to execute instructions of vehicle applications 108 to provide features such as navigation, remote control, and wireless communication. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies.

The computing platform 104 may be provided with various features allowing the vehicle occupants/users to interface with the computing platform 104. For example, the computing platform 104 may receive input from HMI controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems. Map data used for route planning may be stored in the storage 110 as a part of the vehicle data 126. Navigation software may be stored in the storage 110 as one of the vehicle applications 108.

The computing platform 104 may be further provided with a wireless transceiver 128 that wirelessly communicates with a mobile device (not shown) of the vehicle users/occupants via a wireless connection. The mobile device may be any of various types of portable computing devices, such as cellular phones, tablet computers, wearable devices, smart watches, smart fobs, laptop computers, portable music players, or other devices capable of communication with the computing platform 104. The wireless transceiver 132 may be in communication with a Wi-Fi controller 130, a Bluetooth controller 132, a radio-frequency identification (RFID) controller 134, a near-field communication (NFC) controller 136, and other controllers such as a Zigbee transceiver, an IrDA transceiver, a ultra-wide band (UWB) controller (not shown), and configured to communicate with a compatible wireless transceiver of various entities such as the mobile device. The wireless transceiver 128 may wirelessly communicate with the server 148 via the wireless network 142.

The computing platform 104 may be further configured to communicate with various components of the vehicle 102 via one or more in-vehicle network 137. The in-vehicle network 137 may include, but is not limited to, one or more of a controller area network (CAN), an Ethernet network, and a media-oriented system transport (MOST), as some examples. Furthermore, the in-vehicle network 137, or portions of the in-vehicle network 137, may be a wireless network accomplished via Bluetooth low-energy (BLE), Wi-Fi, UWB, or the like.

The computing platform 104 may be configured to communicate with various ECUs 138 of the vehicle 102 configured to perform various operations. For instance, the computing platform 104 may be configured to communicate with a TCU 140 configured to control telecommunication between vehicle 102 and a wireless network 142 through a wireless connection 144 using a modem 146. The wireless connection 144 may be in the form of various communication networks (e.g., a cellular network). Through the wireless network 142, the vehicle may access one or more servers 148 to access various content for various purposes. It is noted that the terms wireless network and server are used as general terms in the present disclosure and may include any computing network involving carriers, router, computers, controllers, circuitry or the like configured to store data and perform data processing functions and facilitate communication between various entities. The ECUs 138 may further include a powertrain control module (PCM) 150 configured to operate a powertrain of the vehicle 102. For instance, the PCM 150 may be configured to start the vehicle responsive to receiving a command from the mobile device via the TCU 140. The ECUs 138 may further include an autonomous driving controller (ADC) 152 configured to control an autonomous driving feature of the vehicle 102. Driving instructions may be received remotely from the server 148. The ADC 152 may be configured to perform the autonomous driving features using the driving instructions combined with navigation instructions from the navigation controller 122.

The computing platform 104 and the ECUs 138 may be supplied with power from a vehicle battery 154 via one or more power relays 156 through a powerline 158. The battery 154 may include a low-voltage battery (e.g., 12V battery) used in a conventional vehicle. Alternatively, the battery 154 may include a high-voltage battery configured to power an electric machine (not shown) of the vehicle 102 in case that the vehicle 102 is a hybrid electric vehicle and/or a battery electric vehicle. A DC/DC converter may be attached to the battery 154 to convert the battery voltage into one or more predefined voltages suitable for power converter to the ECUs 138 and components of the computing platform 104 (hereinafter collectively referred to as "the controllers"). The powerline 158 supplying the power from the battery 154 to each of the components of the vehicle 102 may include a primary power converter 160 and an auxiliary power converter 162. The primary power converter 160 may be connected and disconnected from the battery 154 via the power relay 156 controlled by one or more controllers of the vehicle 102. For instance, the operation of the power relay 156 may be individually controlled via the PCM 150 based on communications via the in-vehicle network 137. Alternatively, the operation of the power relay 156 may be individually controlled by the computing platform 104 in communication with the ECUs 138 via the communication network 137. Alternatively, the relay 156 may be collectively controlled by more than one controller of the vehicle 102. When the power relay 156 is activated and connects the powerline 158 to the battery 154, the battery 154 may supply electric power to each of the ECUs 138 and the computing platform 104 via the primary power converter 160 to enable the normal operations of each controller described above. When the power relay 156 is deactivated and the battery is disconnected from the primary power supply, the controllers may still be able to draw a smaller current from the battery 154 via the auxiliary power supply. The auxiliary power converter 162 may have a predefined smaller power limit for each controller as compared with the primary power converter 160 to enable the controllers to sustain basic functionalities such as keeping alive memory storage, a real-time clock, or the like. It is noted that the converter configuration illustrated in FIG. 1 is merely an example and other configurations may be utilized under substantially the same principle. For instance, each ECU, controller, and/or platform may be provided with one or more individual primary converter and auxiliary converter, in lieu of or in addition to, the collective primary converter 160 and auxiliary converter 162 to perform the same operations as described herein. The auxiliary power consumption may be reduced responsive to the controllers entering a low power operating mode responsive to a control signal via the in-vehicle network 137 before disconnecting from the primary power converter 160. The controllers may not be able to communicate via the in-vehicle network 137 while on the auxiliary power converter 162 alone. Therefore, it may be desirable for the vehicle 102 to verify the controllers have entered the low power mode before disconnecting the battery 154 from the primary power converter 160 to reduce the power consumption when the vehicle 102 is not being used.

Referring to FIG. 2, an example flow diagram for a vehicle controller shutdown coordination process 200 of one embodiment of the present disclosure is illustrated. It should be noted that process 200 may be individually or collectively implemented via one or more ECUs, controllers, components of the vehicle 102 described or not described herein. For simplicity purposes, the following description will be made with reference to PCM 150 as a non-limiting example. With continuing reference to FIG. 1, responsive to detecting the vehicle 102 is shutdown (e.g., a vehicle key-off event) at operation 202, a master controller i.e., the PCM 150, broadcasts a message via the in-vehicle network 137 to command all slave controllers to enter the low power mode at operation 204. The slave controllers may include one or more of the ECUs 138, or other components of the computing platform 104 as an example. The PCM 150 further starts a timer having a predefined length (described in detail below). At operation 206, the PCM 150 monitors heartbeat signals transmitted from each of the slave controllers. The PCM 150 may be configured to maintain a list of slave controllers as previously identified to keep a tracking record of the status of each slave controller. Each of the slave controllers may be configured to broadcast a heartbeat signal indicative of its operating status onto the in-vehicle network 137. The heartbeat signal may be a high-frequency signal repeatedly broadcasted by each slave controller at a predefined time interval (e.g., every a few milliseconds). The heartbeat signal may include a unique identifier such that the PCM 150 (as well as other receiving entities) may identify the source of the signal. The slave controllers may be configured to only broadcast the heartbeat signal when they are in normal operating mode, and cease to broadcast the heartbeat signal when they enter the low power mode. Therefore, by monitoring the heartbeat signals, the PCM 150 may determine the operating status of each of the slave controllers to coordinate the power shutdown.

At operation 208, if the PCM 150 no longer detects the heartbeat signal from a predefined slave controller on the list, the process proceeds to operation 210 and the PCM 150 marks that corresponding controller as having entered the low power mode and proceeds to operation 212 to determine if all corresponding controllers have entered the low power mode. If the PCM 150 determines all corresponding controllers have entered the low power mode, the process proceeds to operation 214 and the PCM 150 operates the power relay 156 to disconnect the battery 154 from the primary power converter 160. The PCM 150 may command itself to enter the low power mode before deactivating the power relay 156. Otherwise, if the PCM 150 determines not all slave controllers have entered the low power mode, the process proceeds to operation 216 to verify if the timer has expired. The timer may be used to guarantee disconnection from the primary power converter 160 in case one or more slave controllers do not enter the low power mode and hold back the shutdown process. The timer may be set to a predefined period (e.g., 5 seconds) after which the power relay 156 will be disconnected anyway. If the PCM 150 verifies that the timer has expired at operation 216, the process proceeds to operation 214 to disconnect the power relay. Otherwise, the process returns to operation 206 and the PCM 150 continues to monitor the heartbeat signals from the remaining slave controllers.

Alternatively, responsive to the expiration of the timer, the process may proceed from operation 216 to operation 218 for the vehicle 102 to seek for additional approval from the server 148 before proceeding to disconnect the primary power converter 160. At operation 218, the PCM 150 obtains status information (e.g., data logs) from those slave controllers that are still sending the heartbeat signal after the expiration of the timer and sends the status information to the server 148 for analysis. The PCM 150 may send the status information to the server 148 via the one or more of the TCU 140 or the wireless transceiver 128. If the PCM 150 determines one of the TCU 140 and the wireless transceiver 128 has already entered the low power mode while the other one is still lingering in the operation mode using the heartbeat signal, the PCM 150 may use the lingering one to send the status information directly. Otherwise, if both the TCU 140 and the wireless transceiver 128 have already entered the low power mode, the PCM 150 may wake up one of them (e.g., the wireless transceiver 128) to transmit the status information to the server at operation 218. Responsive to receiving a server message, at operation 220, the PCM 150 verifies if the power shutdown is prohibited by the server. There may be various reasons that the server 148 may prevent the primary power converter 160 from shutting down. For instance, a lingering slave controller may be performing a software update which prevents the controllers from entering the low power mode. If the power shutdown is prohibited, the process returns to operation 206 without disconnecting the primary power converter 160. Otherwise, the process proceeds to operation 214. The PCM 150 may once again, command the wireless transceiver 128 to enter the low power mode before disconnecting the primary power converter 160.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle controller system comprising:
   an in-vehicle network;
   a first controller; and
   a plurality of second controllers each programmed to
      periodically send, via the in-vehicle network, the first controller signals indicating operation in a normal power mode while being powered by a primary power converter,
      transition to a low power mode, in which the second controller consumes less power than during the normal power mode, while being powered by the primary power converter, responsive to receiving a request from the first controller
      not send the signals during the low power mode while being capable of being powered by an auxiliary power converter that has a maximum power limit less than the primary power converter, and
      be unable to communicate with the first controller and receive the request via the in-vehicle network responsive to being exclusively powered by the auxiliary power converter,
   wherein the first controller is programmed to send the second controllers a request to enter the low power mode, and responsive to not receiving the signals for a predetermined period of time, disconnect the first and second controllers from the primary power converter without disconnecting the first and second controllers from the auxiliary power converter, and responsive to expiration of a timer, disconnect the first and second controllers from the primary power converter regardless of whether the first controller is receiving the signals.

2. The system of claim 1, wherein the first controller is further programmed to, responsive to receiving the signals after expiration of a timer, obtain a data log from one or more of the second controllers that are sending the signals and send the data log to a remote server, and responsive to receiving permission from the remote server to disconnect the one or more of the second controllers from the primary power converter, disconnect the first and second controllers from the primary power converter.

3. The system of claim 2, wherein the second controllers includes a wireless transceiver, and wherein the first controller is further programmed to wake the wireless transceiver from the low power mode and command the wireless transceiver to transmit the data log to the remote server, and to send the wireless transceiver a request to enter the low power mode after receiving the permission and before disconnecting the first and second controllers from the primary power converter.

4. The system of claim 2, wherein one of the one or more of the second controllers is a wireless transceiver, and wherein the first controller is further programmed to command the wireless transceiver to transmit the data log to the remote server.

5. The system of claim 1, wherein the first controller is further programmed to enter the low power mode before disconnecting the first and second controllers from the primary power converter.

6. A method of powering down vehicle controllers, comprising:
   periodically sending, from each of a plurality of secondary controllers to a primary controller, signals indicating operation in a normal power mode while the secondary controllers are being powered by a primary power converter;
   sending, from the primary controller to the secondary controllers, a request to enter a low power mode in which the secondary controllers consume less power than during the normal power mode;
   responsive to the secondary controllers receiving the request, transitioning the secondary controllers to the low power mode and discontinuing by the secondary controllers the sending of the signals while being powered by an auxiliary power converter that has a maximum power limit less than the primary power converter;
   responsive to the primary controller not receiving for a predetermined period of time the signals after the sending the request to enter the lower power mode, disconnecting the primary and secondary controllers from the primary power converter without disconnecting the primary and secondary controllers from the auxiliary power converter; and
   entering, by the primary controller, the low power mode before disconnecting the primary and secondary controllers from the primary power converter.

7. The method of claim 6 further comprising, responsive to expiration of a timer, disconnecting by the primary controller the primary and secondary controllers from the primary power converter regardless of whether the primary controller is receiving the signals.

8. The method of claim 6 further comprising, responsive to receiving the signals after expiration of a timer, obtaining by the primary controller a data log from one or more of the secondary controllers that are sending the signals, sending the data log to a remote server, and responsive to the primary controller receiving permission from the remote server to disconnect the one or more of the secondary controllers from the primary power converter, disconnecting the primary and secondary controllers from the primary power converter.

9. The method of claim 8, wherein the secondary controllers include a wireless transceiver, further comprising by the primary controller waking the wireless transceiver from the low power mode and commanding the wireless transceiver to transmit the data log to the remote server, and sending from the primary controller to the wireless transceiver a request to enter the low power mode after the receiving the permission and before the disconnecting the first and second controllers from the primary power converter.

10. The method of claim 8, wherein one of the one or more of the secondary controllers is a wireless transceiver, further comprising by the primary controller commanding the wireless transceiver to transmit the data log to the remote server.

11. A vehicle comprising:
   a first controller programmed to send a request to enter a lower power mode; and a plurality of second controllers each programmed to periodically send the first controller signals indicating operation in a normal power mode while being powered by a primary power converter, and responsive to receiving the request, to not send the signals during the low power mode while being powered by an auxiliary power converter that has a maximum power limit less than the primary power converter, wherein the second controllers consume less power during the low power mode than during the normal power mode, wherein the first controller is further programmed to, responsive to expiration of a timer, disconnect the first and second controllers from the primary power converter regardless of whether the first controller is receiving the signals.

12. The vehicle of claim 11, wherein the first controller is further programmed to, responsive to not receiving the signals for a predetermined period of time, disconnect the first and second controllers from the primary power converter without disconnecting the first and second controllers from the auxiliary power converter.

13. The system of claim 11, wherein the first controller is further programmed to, responsive to receiving the signals after expiration of a timer, obtain a data log from one or more of the second controllers that are sending the signals and send the data log to a remote server, and responsive to receiving permission from the remote server to disconnect the one or more of the second controllers from the primary power converter, disconnect the first and second controllers from the primary power converter.

14. The system of claim 13, wherein the second controllers include a wireless transceiver, and wherein the first controller is further programmed to wake the wireless transceiver from the low power mode and command the wireless transceiver to transmit the data log to the remote server, and to send the wireless transceiver a request to enter the low power mode after receiving the permission and before disconnecting the first and second controllers from the primary power converter.

15. The system of claim 13, wherein one of the one or more of the second controllers is a wireless transceiver, and wherein the first controller is further programmed to command the wireless transceiver to transmit the data log to the remote server.

16. The system of claim 11, wherein the first controller is further programmed to enter the low power mode before disconnecting the first and second controllers from the primary power converter.

* * * * *